Patented July 12, 1938

2,123,371

UNITED STATES PATENT OFFICE 2,123,371

PROCESS FOR THE MANUFACTURE OF AMMONIUM DITHIOCARBAMATE

Roger A. Mathes, Akron, Ohio, assignor to The B. F. Goodrich Company, New York, N. Y., a corporation of New York No Drawing. Application September 30, 1937, Serial No. 166,587

12 Claims. (Cl. 260—112)

This invention relates to an improved process for the manufacture of ammonium dithiocarbamate.

The objects of the invention are the manufacture of ammonium dithiocarbamate of high purity, in yields which approach the theoretical, at an economical cost. These objects have not been previously attainable by the methods described in the literature.

Previous workers used alcohol as a diluting medium or diluent for the interaction of carbon disulfide and ammonia to form ammonium dithiocarbamate. Poor yields of rather impure ammonium dithiocarbamate were obtained.

According to the present invention, carbon disulfide is dissolved in a cyclic ether or poly ether of the glycols, which serves as a diluent, and ammonia is passed in. Ammonium dithiocarbamate is formed as a crystalline compound and precipitates almost immediately.

Among the ethers which give satisfactory results are cyclic ethers, as 1,4-dioxane, ethylene oxide, propylene oxide. Poly ethers of the glycols, as ethylene glycol dimethyl ether, ethylene glycol diethyl ether, proylene glycol diethyl ether, and diethylene glycol diethyl ether, are also satisfactory diluents.

The reaction is preferably carried out in a reactor provided with some cooling device such as a jacket for circulating brine. Approximately one molecular proportion of carbon disulfide is dissolved in the diluting ether. Approximately two molecular proportions of gaseous ammonia are passed in, with agitation.

The temperature for carrying out the reaction may be varied. A range of 15°–35° C. is convenient for operating purposes and gives satisfactory results. Lower temperatures may also be employed.

The reaction can be carried out at a pressure greater than atmospheric in which case loss of ammonia is prevented.

After a short period of ammonia addition, ammonium dithiocarbamate crystalizes out, being only sparingly soluble in the diluting ethers commonly employed. When the required amount of ammonia has been added agitation is preferably continued for a short time, and the ammonium dithiocarbamate is then filtered off. The product may be air dried to remove the ether. If higher boiling ethers are employed, a wash with an inert, volatile solvent is desirable.

A modification in this procedure may be adopted when a water solution of ammonium dithiocarbamate is desired. Water is added to the suspension of ammonium dithiocarbamate in the diluting ether, which should be a compound having a low water solubility, such as ethylene glycol diethyl ether or its higher homologues. The product is readily dissolved and its water solution separated from the ether.

The following examples describe the process more specifically, but it will be understood that the invention is not limited to these details. Wide variations both in the process and amounts of reactants are possible without materially affecting the results.

Example 1

107 g. of carbon disulfide are dissolved in 500 cc. of ethylene glycol diethyl ether in a reaction flask. Over a period of about two hours, 45 g. of ammonia are passed in, with agitation. After a few minutes of ammonia addition, light yellow crystals of ammonium dithiocarbamate start to precipitate. The temperature is maintained at 18–24° C. during the course of the reaction.

After all the ammonia has been added, the thick reaction mixture is allowed to agitate about fifteen minutes, then filtered and washed with hexane. The dry weight is 135 g. representing a 92% yield.

Example 2

The process, essentially as described in Example 1, is repeated using 19 g. of carbon disulfide, 8.5 g. of ammonia and 125 cc. 1,4 dioxane. The ammonium dithiocarbamate, after filtering, is washed with hexane and dried. The dry weight is 26.2 g. representing a 95.5% yield.

The invention is not limited to the ethers specifically named.

From the data herein presented the fact will be readily apparent that this invention constitutes a distinct improvement over previous processes for preparing ammonium dithiocarbamate. Yields have been increased to over 90%. The quality of ammonium dithiocarbamate has been greatly improved making purification unnecessary before use of the compound from synthetic work. By this improvement in quality, a distinctly more stable compound is obtained. Conditions for its preparation according to this invention do not require close control. A wide temperature range may be used; the amounts of reactants may be varied greatly from those theoretically required, without affecting adversely either the yield or quality of ammonium dithiocarbamate produced.

I claim:

1. A process for the manufacture of ammonium dithiocarbamate which comprises reacting carbon disulfide and ammonia in a member of the group consisting of cyclic ethers and poly ethers of the glycols.

2. A process according to claim 1 where substantially one molecular proportion of carbon disulfide is reacted with substantially two molecular proportions of ammonia.

3. A process according to claim 1 where the ammonium dithiocarbamate formed is water extracted from the suspension in a cyclic ether or poly ether of the glycols, of low water solubility.

4. A process for the manufacture of ammonium dithiocarbamate which comprises reacting carbon disulfide and ammonia in a diluting medium consisting of a cyclic ether of a glycol.

5. A process for the manufacture of ammonium dithiocarbamate which comprises the introduction of gaseous ammonia into carbon disulfide diluted with a cyclic ether of glycol.

6. A process for the manufacture of ammonium dithiocarbamate which comprises the introduction of substantially two molecular proportions of ammonia into substantially one molecular proportion of carbon disulfide diluted with a cyclic ether of a glycol.

7. A process for the manufacture of ammonium dithiocarbamate which comprises reacting carbon disulfide and ammonia in a diluting medium consisting of a poly ether of a glycol.

8. A process for the manufacture of ammonium dithiocarbamate which comprises the introduction of substantially two molecular proportions of gaseous ammonia into substantially one molecular proportion of carbon disulfide diluted with a poly ether of a glycol.

9. A process for the manufacture of ammonium dithiocarbamate which comprises reacting carbon disulfide and ammonia in a diluting medium consisting of 1,4-dioxane.

10. A process for the manufacture of ammonium dithiocarbamate which comprises the introduction of substantially two molecular proportions of gaseous ammonia into substantially one molecular proportion of carbon disulfide diluted with 1,4 dioxane.

11. A process for the manufacture of ammonium dithiocarbamate which comprises reacting carbon disulfide and ammonia in a diluting medium consisting of ethylene glycol diethyl ether.

12. A process for the manufacture of ammonium dithiocarbamate which comprises the introduction of substantially two molecular proportions of gaseous ammonia into substantially one molecular proportion of carbon disulfide diluted with ethylene glycol diethyl ether.

ROGER A. MATHES.